June 19, 1962     J. N. SIMPSON     3,039,109

LINING FOR SAFETY HELMETS

Filed Oct. 16, 1958

INVENTOR.

Jack N. Simpson.

BY

William J. Ruano

ATTORNEY.

United States Patent Office 3,039,109
Patented June 19, 1962

3,039,109
LINING FOR SAFETY HELMETS
Jack N. Simpson, Reading, Pa., assignor to The Electric Storage Battery Company, Philadelphia, Pa.
Filed Oct. 16, 1958, Ser. No. 767,554
4 Claims. (Cl. 2—3)

This invention relates to a lining suspension, or cradle for safety hats or helmets for the protection of the aviator, vehicle racer or workman, wearing such helmet, against impact or shock when the helmet is struck by a heavy blow.

Aviator helmets, in the past, have been lined with resilient, padding material such as foam rubber and the like for the purpose of cushioning against shock. However, these materials have not proved entirely satisfactory since they readily yield, under impact, thereby providing practically no significant protection after a predetermined degree of yielding of the liner. Attempts have been made to overcome this disadvantage by providing cellular, rigid but crushable liner constructions which would compress and rupture or crumble eventually under severe shocks, but these have not been found satisfactory, particularly since the liner is destroyed on impact.

An object of my invention is to provide a liner construction for crash helmets, such as used by aviators, and for industrial helmets, as used by industrial workmen for protection against falling objects and the like, which liner will provide an extremely high degree of comfort in wear and yet will provide maximum protection against heavy blows so as to fully protect the workman against shock from such impacts all the time.

A more specific object of my invention is to provide a liner for safety helmets, such liner made up of a plurality of pads which are filled with fluid, particularly air or liquids, and which liners are of flexible material so as to provide a certain amount of yieldability.

Other objects of the invention will become more apparent from a study of the following description taken with the accompanying drawing wherein:

FIG. 1 is a vertical cross-sectional view taken through an industrial safety hat or crash helmet for aviators and having a fluid filled liner embodying the principles of the present invention.

FIGS. 2, 3 and 4 are enlarged plan views showing various modifications of the pad or cushion construction, and FIGS. 5, 6 and 7 are cross sectional views taken along lines V—V, VI—VI, and VII—VII of FIGS. 2, 3 and 4, respectively.

Figure 1:
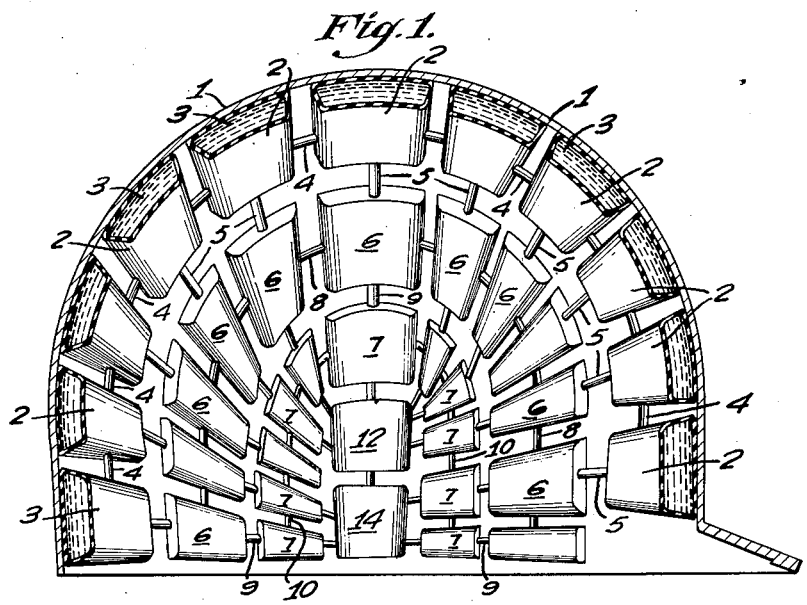

Referring more particularly to the drawing, numeral 1 denotes a safety helmet of any suitable material, such as aluminum, phenolic impregnated material or plastic material, particularly plastic material embedded with fibre glass; and numerals 2, 6, 7, 12 and 14 denote a plurality of cushions or pads which are filled with fluid 3. The fluid may be air or any suitable gas; however, I have found that far superior results are obtained by using a fluid in a nature of a liquid, such as water, silicone, or a mixture of water and glycerine in about equal proportions or perhaps a range of between 30% and 70% glycerine and the remainder water, or other liquids such as syrups or similar viscous materials, or grease or jells which readily flow under pressure.

A series of rows of pads or cushions, such as 2, 6, and 7, are provided and arranged in a manner so as to be uniformly distributed over the entire inner surface area of the safety helmet in the manner shown. The various pads are interconnected by small tubes, such as 4, 5, 8, 9 and 10 to provide fluid intercommunication between the pads, also to provide a predetermined amount of restriction or control of the flow between the pads to obtain the desired amount of yieldability under shock. Thus the force of an abnormal blow is yieldably distributed uniformly about the entire surface of the head, until finally, because of the incompressibility of the liquid, the cushions will no longer compress except to the extent permitted by the stretchability of the material forming the cushions. In some instances, however, the pads may be entirely separate, that is, not in communication. Or perhaps, only some groups of pads may be in intercommunication and isolated from other rendered inoperative and still a certain amount of protection is afforded by the remaining pads which are intact or which have not been ruptured.

The desired fluid or liquid is introduced in the various pads by means of at least a pair of valves (not shown), one for introducing the fluid and the other for allowing escape of air inside the pads, which valves are later removed or pinched off the pads, or otherwise sealed.

The various cushions 2, 6, 7, 12 and 14 are preferably made of elastic or flexible material, preferably a plastic material, for example, vinyl plastic or the like, the thickness of which may be varied in accordance to the yieldability or stretchability desired.

The various cushions 2, 6, 7, 12 and 14 preferably only partially filled with fluid, in which event the air contained therein may be completely withdrawn or expelled so that the cushion contains solely a fluid filling, exclusive of air. Thus, the cushions will readily flex and become fitted to the contour of the head of the wearer.

However, in some instances it may be desired to allow a certain amount of air, as well as liquid, in the cushions for providing a certain degree of compressibility of the entire volume of the cushion before the full resistance of the liquid is encountered, it being well known that the liquid itself is incompressible. But even in cases where the cushions are entirely filled with liquid exclusive of air, there would be a certain amount of yieldability of the pads because of the elasticity of the cushion sheath material. However, even when the elastic limit of the cushion material is reached so as to effect rupture, of certain of the pads, it is not too serious a matter, because it affords complete protection to the aviator or workman in the unusual event of very severe impact, also it would be an easy matter to replace one or more groups of pads, in which event the cost is insignificant compared to the avoidance of a severe injury.

The various interconnecting tubes 4, 5, 8, 9 and 10 are likewise of similar plastic material and the restriction to flow of liquid through these tubes may be controlled by making them smaller in diameter or by slipping over such tubes rubber bands (not shown) to constrict the passageway through the tubes.

The fluid filling in the pads may be air. However, significantly superior results are obtained when the filling is of a liquid, such as water, silicone, or a mixture of 30% to 70% glycerine and the remainder water, or a highly viscous syrupy liquid or grease.

Figure 2:
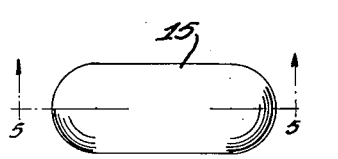
Figure 5:
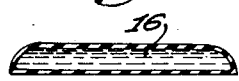

FIGS. 2 and 5 show a modification of the pad construction wherein the pad 15 is somewhat elliptical in outline and contains a fluid filling 16.

Figure 3:
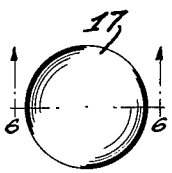
Figure 6:
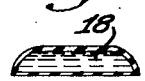

FIGS. 3 and 6 show a further modification in which the pad 17 is somewhat disc-shaped and contains a fluid filling 18.

Figure 4:
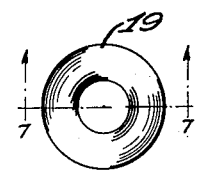
Figure 7:

FIGS. 4 and 7 show still further modification of the pad which is substantially doughnut shaped or annular.

Figure 8:
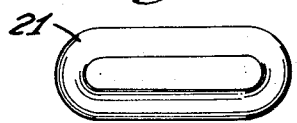
FIG. 8 is a plan view of a still further modification of the padding or cushion.
Figures 9, 10:
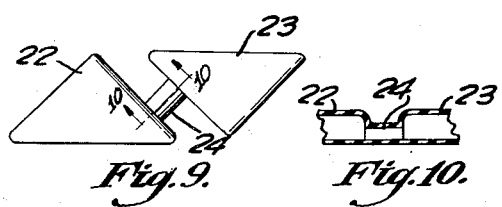
FIG. 9 is another modification of the padding construction.
FIG. 10 is a cross-sectional view taken along line X—X of FIG. 9.

FIG. 8 shows another modification which is shaped somewhat like an elongated doughnut; and FIGS. 9 and 10 show a still further modification of the pad construction 22, 23, which is somewhat triangular shaped and has intercommunicating passageways 24.

Thus it will be seen that I have provided a liner construction for safety helmets, which liner is in the form of fluid filled cushions which provide a high degree of protection against very severe impact such as occurs in crash landings and the like; furthermore, I have provided a liner which is filled with liquids which provide a high degree of comfort in wear as well as an amazing degree of resistance against severe shocks so as to afford protection even under the most severe shocks.

While I have illustrated and described several embodiments of my invention, it will be understood that these are by way of illustration only, and that various changes and modifications may be made within the contemplation of my invention and within the scope of the following claims.

I claim:

1. In combination with a safety helmet, a liner attached to the inner surface of said helmet for protection against very severe impact, said liner comprising a plurality of cushions of flexible material, said cushions being at least partially filled with a highly viscous liquid, and a plurality of tubes of relatively small diameter interconnecting at least certain of said cushions for restricting the rate of flow of said highly viscous liquid between cushions sufficiently so as to make the liner relatively imcompressible and thereby afford protection to the wearer when the helmet is struck with a very severe blow.

2. A safety helmet as recited in claim 1 wherein said cushions are of round shape and are substantially uniformly distributed throughout the entire inner surface of said helmet.

3. A safety helmet as recited in claim 1 wherein said cushions are of annular shape and are substantially uniformly distributed throughout the inner surface of said helmet.

4. A safety helmet as recited in claim 1 wherein said cushions are of triangular shape and are substantially uniformly distributed throughout the entire area of the inner surface of said helmet.

References Cited in the file of this patent

UNITED STATES PATENTS

| | | |
|---|---|---|
| 906,923 | Podstata | Dec. 15, 1908 |
| 1,348,950 | Kaminski | Aug. 10, 1920 |
| 1,833,708 | Ford | Nov. 24, 1931 |
| 2,236,662 | Wright | Apr. 1, 1941 |
| 2,239,946 | Upchurch | Apr. 29, 1941 |
| 2,618,780 | Cushman | Nov. 25, 1952 |
| 2,664,567 | Nichols | Jan. 5, 1954 |
| 2,759,186 | Dye | Aug. 21, 1956 |
| 2,768,919 | Bjorksten et al. | Oct. 30, 1956 |
| 2,774,447 | De Carbon | Dec. 18, 1956 |
| 2,801,423 | Shaw et al. | Aug. 6, 1957 |
| 2,875,861 | Lucien | Mar. 3, 1959 |